(12) United States Patent
Fladgard et al.

(10) Patent No.: US 7,540,091 B2
(45) Date of Patent: *Jun. 2, 2009

(54) EXTENDED LIFE CUTTING BLADES FOR HAND-HELD CUTTING TOOLS

(75) Inventors: Lloyd E. Fladgard, Kingston, WA (US); Scott C. Fladgard, Kingston, WA (US)

(73) Assignee: Shear Tech, Inc., Kingston, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/440,597

(22) Filed: May 24, 2006

(65) Prior Publication Data

US 2006/0207107 A1 Sep. 21, 2006

Related U.S. Application Data

(62) Division of application No. 09/928,259, filed on Aug. 11, 2001.

(60) Provisional application No. 60/311,401, filed on Aug. 10, 2001.

(51) Int. Cl.
*B23P 19/04* (2006.01)
*B23P 19/00* (2006.01)

(52) U.S. Cl. ................ 30/134; 30/166.3; 30/339; 30/194; 83/13; 241/101.71; 125/23.01

(58) Field of Classification Search .......... 30/131, 30/194, 225, 228, 339, 353, 258, 289, 233; 241/101.72, 101.74; 451/356; 125/23.01
See application file for complete search history.

(56) References Cited

U.S. PATENT DOCUMENTS

| | | | |
|---|---|---|---|
| 1,345,882 A | 7/1920 | Repass | |
| 1,920,711 A | 8/1933 | Pelizzola | |
| 1,996,813 A | 4/1935 | Jeppsson | |
| 2,874,465 A | 2/1959 | Sillak | |
| 2,934,822 A | 5/1960 | Docken | |
| 3,808,682 A | 5/1974 | Sumida | |
| 4,173,069 A | 11/1979 | Sidenstick et al. | |
| 4,519,135 A * | 5/1985 | LaBounty | 30/134 |
| 4,689,884 A | 9/1987 | Chavarria | |
| 4,897,921 A | 2/1990 | Ramun | |
| 5,142,779 A * | 9/1992 | LaBounty | 30/134 |
| 5,172,479 A * | 12/1992 | Keeton | 30/228 |
| 5,197,193 A | 3/1993 | Smith | |
| 5,379,521 A | 1/1995 | Lynders | |
| 5,531,007 A | 7/1996 | Labounty | |
| 5,566,454 A * | 10/1996 | Eisenbraun | 30/228 |
| 5,570,678 A | 11/1996 | Waggoner et al. | |

(Continued)

FOREIGN PATENT DOCUMENTS

JP 2005-164691 6/2005

*Primary Examiner*—Ghassem Alie
(74) *Attorney, Agent, or Firm*—Perkins Coie LLP

(57) ABSTRACT

An extended-life cutting blade is adapted for mounting on a hand-held cutting tool in multiple operative orientations. A single cutting blade may provide up to four independent shear edges, each of which has a useful life. The blade can be easily changed from an orientation adapted to cut a workpiece with one shear edge to a different operative orientation adapted to cut with a different shear edge by selecting an appropriate mount on the blade.

14 Claims, 6 Drawing Sheets

U.S. PATENT DOCUMENTS

| | | |
|---|---|---|
| 5,619,881 A | 4/1997 | Morikawa et al. |
| 5,722,386 A | 3/1998 | Fladgard et al. |
| 5,974,670 A | 11/1999 | Hsieh et al. |
| 5,992,023 A | 11/1999 | Sederberg et al. |
| 5,992,024 A * | 11/1999 | Rogers .................. 30/228 |
| 5,993,303 A * | 11/1999 | Fladgard et al. ............. 451/356 |
| 6,202,308 B1 | 3/2001 | Ramun |
| D443,806 S * | 6/2001 | Fladgard et al. ............... D8/61 |
| 2002/0023354 A1 | 2/2002 | Lowe et al. |
| 2003/0029043 A1 | 2/2003 | Fladgard |
| 2004/0050223 A1 | 3/2004 | Renecker et al. |
| 2006/0207106 A1 | 9/2006 | Fladgard |
| 2006/0213343 A1 | 9/2006 | Edwards et al. |

\* cited by examiner

EXTENDED LIFE CUTTING BLADES FOR HAND-HELD CUTTING TOOLS

CROSS-REFERENCE TO RELATED APPLICATION

This application is a divisional of U.S. patent application Ser. No. 09/928,259, filed Aug. 11, 2001, which claims priority from U.S. Provisional Patent Application No. 60/311,401, filed Aug. 10, 2001.

TECHNICAL FIELD

The present invention relates to hand-held cutting tools, such as those used to cut fiber-cement siding.

BACKGROUND

The exteriors of houses and other types of buildings are commonly covered with siding materials that protect the internal structures from external environmental elements. The siding materials are typically planks or panels composed of wood, concrete, brick, aluminum, stucco, wood composites or fiber-cement composites. Wood siding is popular, but it is costly and flammable. Wood siding also cracks causing unsightly defects, and it is subject to infestation by insects. Aluminum is also popular, but it deforms easily, expands and contracts in extreme climates and is relatively expensive. Brick and stucco are also popular in certain regions of the country, but they are costly and labor intensive to install.

Fiber-cements siding (FCS) offers several advantages compared to other types of siding materials. FCS is made from a mixture of cement, silica sand, cellulose and a binder. To form FCS siding products, a liquid fiber-cement mixture is pressed and then cured to form FCS planks, panels and boards. FCS is advantageous because it is non-flammable, weather-proof, and relatively inexpensive to manufacture. Moreover, FCS does not rot or become infested by insects. FCS is also advantageous because it may be formed with simulated wood grains or other ornamental designs to enhance the appearance of a building. To install FCS, a siding contractor cuts the panels or planks to a desired length at a particular job site. The siding contractor then abuts one edge of an FCS piece next to another and nails the cut FCS pieces to the structure. After the FCS is installed, trim materials may be attached to the structure and the FCS may be painted.

Although FCS offers many advantages over other siding materials, it is difficult and expensive to cut. Siding contractors often cut FCS with a circular saw having an abrasive disk. Cutting FCS with an abrasive disk, however, generates large amounts of very fine dust that creates a very unpleasant working environment. Siding contractors also cut FCS with shears having opposing blades, as set forth in U.S. Pat. Nos. 5,570,678 and 5,722,386, which are herein incorporated in their entireties by reference. Although the shears set forth in these patents cut a clean edge in FCS without producing dust, many siding contractors prefer to use a hand-held tool because they are accustomed to cutting siding with hand saws. Therefore, in light of the positive characteristics of FCS and the need for a hand-held cutting tool, it would be desirable to develop a hand-held cutting tool that quickly cuts clean edges through FCS without producing dust.

To meet the demand for a hand-held FCS cutting tool, the present inventors developed a hand-held tool with a reciprocating cutting blade which is the subject of U.S. Pat. No. 5,993,303 ("the '303 patent," the entirety of which is incorporated herein by reference). The hand-held tool of the '303 patent may have a hand-held motor unit with a housing, a motor inside the housing, and a switch operatively coupled to the motor to selectively activate the motor. A head having a casing may be attached to the housing of the motor unit. The head may also have a reciprocating drive assembly coupled to the motor.

The hand-held cutting tool of the '303 patent also has a blade set with first and second fingers attached to either the casing or the motor housing, and a reciprocating cutting member between the first and second fingers. The first finger may have a first guide surface and a first interior surface. Similarly, the second finger may have a second guide surface and a second interior surface. The first and second guide surfaces are preferably in a common plane, and the first and second interior surfaces are spaced apart from one another by a gap distance. The reciprocating cutting member of the blade set has a body with a first width approximately equal to the gap distance and a reciprocating blade projecting from the body. The reciprocating blade has a first side surface facing the first interior surface of the first finger, a second side surface facing the second interior surface of the second finger, and a top surface. The first side surface of the blade is preferably spaced apart from the first interior surface of the first finger by 0.040-0.055 inches for cutting ¼ inch and 5/16 inch thick fiber-cement siding. Similarly, the second side surface of the blade is spaced apart from the second interior surface of the second finger by 0.040-0.055 inches. The distance between the first and second side surfaces of the blade and the first and second fingers, respectively, may be approximately 13%-22% of the thickness of the fiber-cement siding workpiece.

The top surface of the reciprocating blade may also have a width less than the first width of the body. For example, the top surface of the reciprocating blade may be between 0.140 and 0.165 inches, and more preferably between 0.160 and 0.165 inches for cutting ¼ inch and 5/16 inch thick fiber-cement siding. The top surface may also have a curvature concave with respect to the first and second guide surfaces of the first and second fingers.

In operation, a drive assembly is operatively coupled to the reciprocating member to reciprocate the blade into and out of the gap between the fingers. As the drive assembly moves the blade into the gap between the fingers, the top surface of the blade and the straight guide surfaces of the fingers shear the fiber-cement siding.

One drawback of the hand-held tool of the '303 patent, however, is that the fingers can be worn away relatively quickly in cutting the abrasive FCS. If the fingers are worn, the edge of the finger may not cleanly break the surface of the FCS or the spacing between the reciprocating blade and the fingers can fall outside desirable tolerances. FCS is a relatively brittle material that tends to crack along rough edges and unpredictable paths. Excessive wear of the shear edge and/or the interior surface of a finger can lead to unacceptable cutting of the FCS.

DETAILED DESCRIPTION

Figure 1:
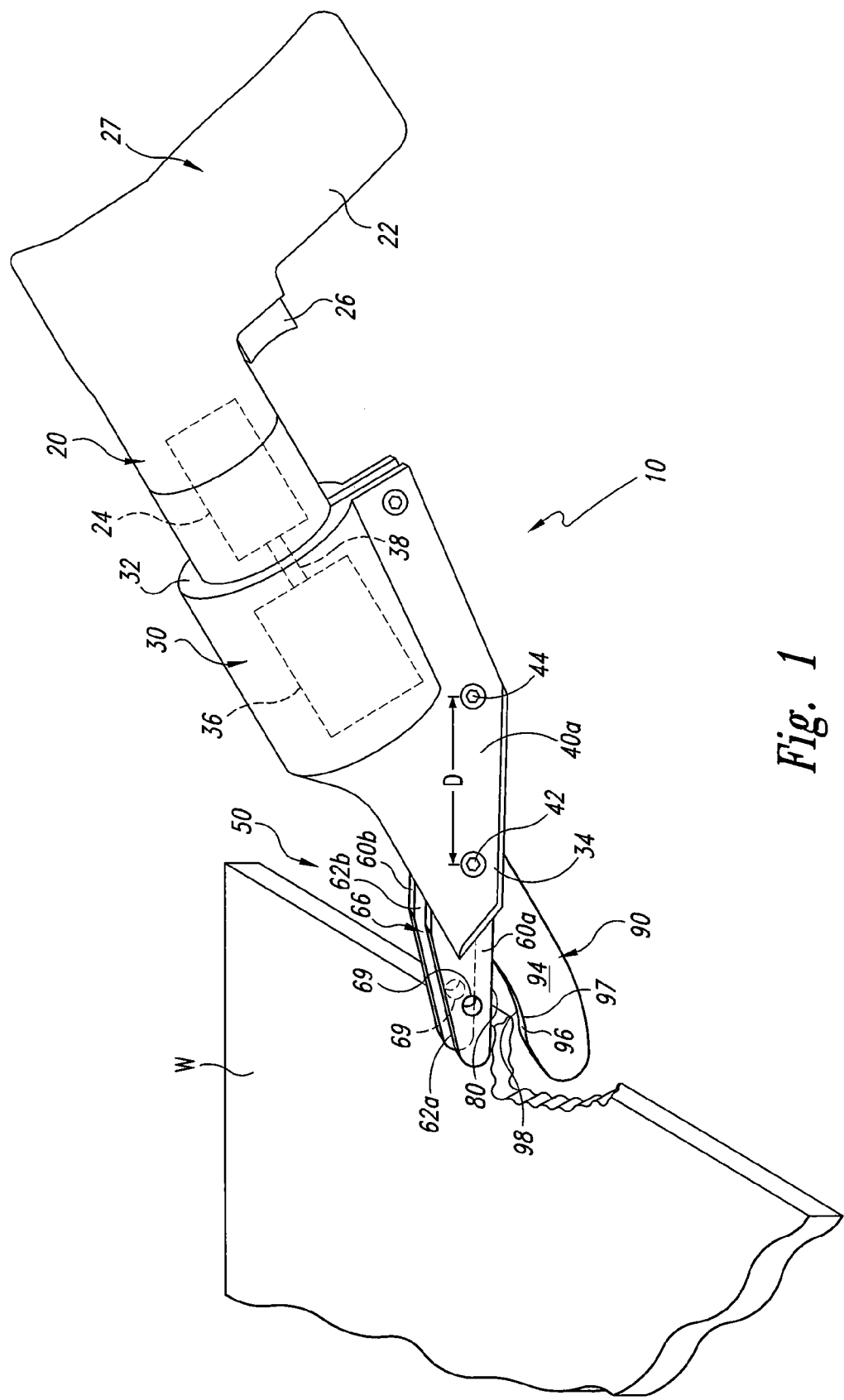
FIG. 1 is an isometric view of a hand-held cutting tool and a blade set in accordance with one embodiment of the invention.

Various embodiments of the present invention provide cutting heads and blades for hand-held cutting tools and methods of reconfiguring a cutting head for a hand-held cutting tool. The following description provides specific details of certain embodiments of the invention illustrated in the drawings to provide a thorough understanding of those embodiments. It should be recognized ,however, that the present invention can be reflected in additional embodiments and the invention may be practiced without some of the details in the following description.

FIG. 1 is an isometric view of a hand-held cutting tool 10 for cutting a workpiece W, which may comprise FCS. The cutting tool 10 has a motor unit 20 with a housing 22, a motor 24 (shown schematically in phantom) inside the housing 22, and a switch 26 operatively coupled to the motor 24. The housing 22 preferably has a handle 27 configured to be gripped by an operator. One suitable motor unit 20 is the No. 3208-90 electric motor unit manufactured by Black and Decker Corporation. Another suitable motor unit 20 is the No. 7802 pneumatic motor unit manufactured by Ingersoll-Rand Corporation.

The output of the motor unit 20 may be converted into a reciprocal motion with a head 30 having a casing 32 and a reciprocating drive assembly 36 (shown schematically in phantom). The casing 32 is attached to the housing 22 of the motor unit 20. Additionally, the reciprocating drive assembly 36 is coupled to the motor 24 via a gear assembly 38 (shown schematically in phantom) to translate the rotational output from the motor unit 20 into a reciprocating motion. A suitable head 30 is the shear head manufactured by Kett Tool Co., as set forth in U.S. Pat. No. 4,173,069, entitled "Power Shear Head," which is herein incorporated by reference.

The cutting tool 10 may also have a blade set 50 with a first blade 60a attached to one side of the head 30, a second blade 60b attached to another side of the head 30, and a cutting member 90 between the first and second blades 60a and 60b. The first and second blades 60a and 60b are preferably attached to the head 30 to space the blades 60a-b from one another by a gap 66 in which the cutting member 90 may be received. In the illustrated embodiment, the blades 60a-b are attached to the casing 32. The casing 32 may include a pair of spaced-apart flanges 40a and 40b which define a support of the casing.

Figure 2:
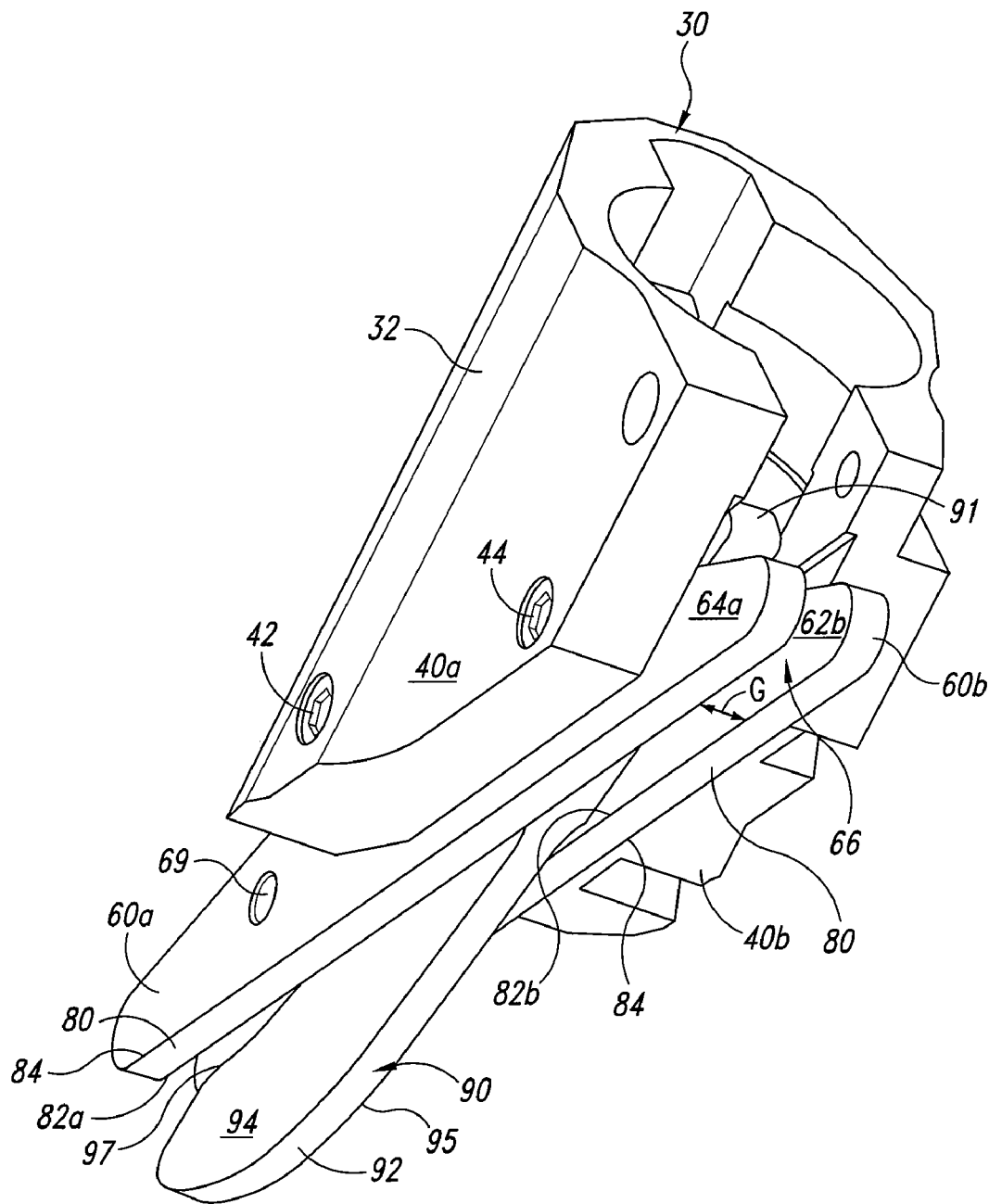
FIG. 2 is a rear isometric view of a casing and blade set in accordance with an embodiment of the invention.
Figure 3:
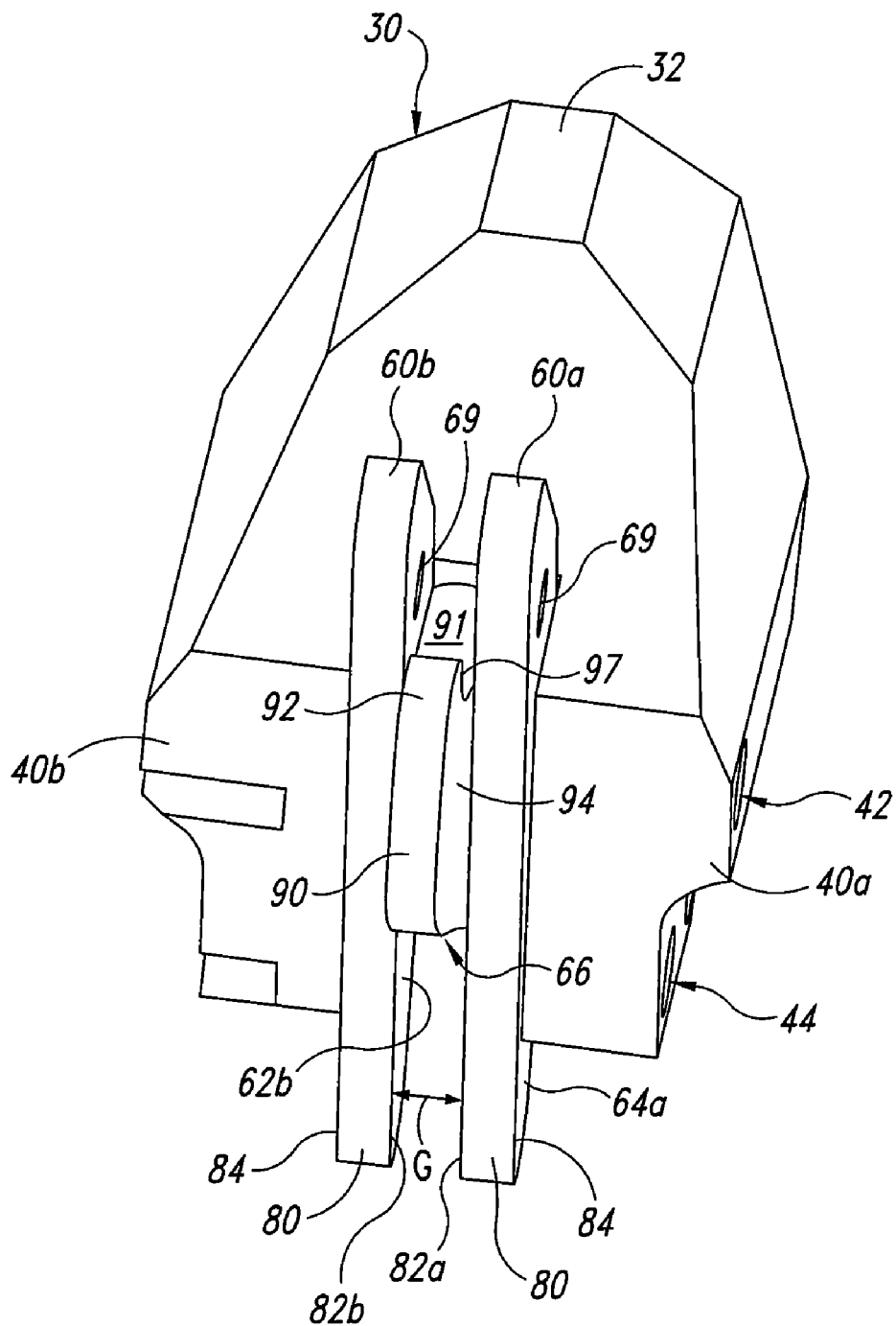
FIG. 3 is a front isometric view of the casing and blade set of FIG. 2.

FIGS. 2 and 3 are perspective views of the blade set 50 used with the hand-held cutting tool 10. The cutting member 90 may have a body 91 with a first width approximately equal to a gap distance G between the first shear face 62a of the first blade 60a and the first shear face 62b of the second blade 60b. The cutting member 90 may also have reciprocating blade 92 projecting from the body 91 between the first and second blades 60a and 60b. The reciprocating blade 92 has a first side surface 94 facing the first blade 60a, a second side surface 95 facing the second blade 60b, and a curved top surface 96. The edge along the top surface 96 and the first side surface 94 defines a first cutting edge 97 of the reciprocating blade 92, and the edge along the top surface 96 and the second side surface 95 defines a second cutting edge 98 of the reciprocating blade 92.

Figure 4A:
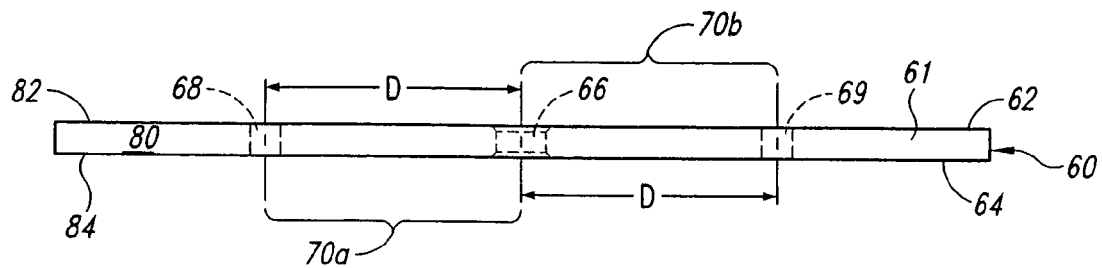
FIG. 4A is a bottom elevational view of one blade of the blade set of FIGS. 1-3.
Figure 4B:
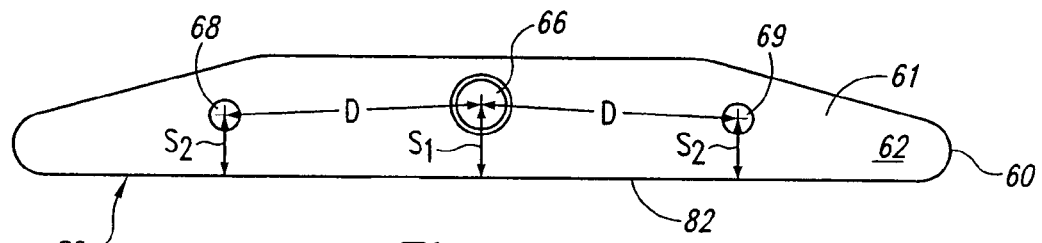
FIG. 4B is a side elevational view of the blade of FIG. 4A.
Figure 4C:
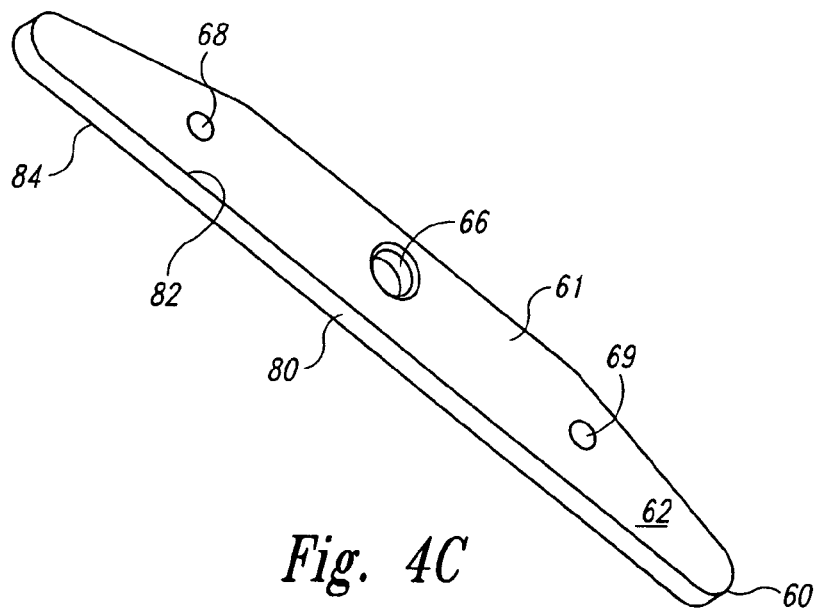
FIG. 4C is a bottom isometric view of the blade of FIG. 4A.

FIGS. 4A-C illustrate a blade 60 in accordance with one embodiment of the invention. The first blade 60a and the second blade 60b shown in FIGS. 1-3 may be identical. Only one blade 60 is shown in FIGS. 4A-C, but it should be understood that the first and second blades 60a-b of FIGS. 1-3 may have the same structure shown in FIGS. 4A-C.

The blade 60 has a body 61. The body includes a first shear face 62 and a second shear face 64. The first and second shear faces 62 and 64 may be substantially planar and parallel to one another. The first and second shear faces 62 and 64 are spaced from one another to define a thickness of the body 61. A guide surface 80 extends between the first and second shear faces 62 and 64 along a first elongate edge of the body 61. A first shear edge 82 is defined at the junction between the guide surface 80 and the first shear face 62. A second shear edge 84 is defined at the junction between the guide surface 80 and the second shear face 64. The first and second shear edges 82 and 84 may be parallel to one another and spaced from one another by the thickness of the body 61.

As noted above, the blade 60 may be carried by the casing 32 of the housing 30. The blade 60 may be attached to the casing 32 in at least two different operative orientations, with a first mount 70a mating with the casing 32 to orient the blade in a first operative orientation and a second mount 70b used to mount the blade 60 in a second operative orientation. In the illustrated embodiment, the first mount 70a comprises a first pair of mounting holes passing through the thickness of the body 61 and the second mount 70b comprises a second pair of mounting holes passing through the thickness of the body 61. In particular, the blade 60 has a central mounting hole 66, which may be disposed generally midway along the length of the blade 60. A first outer mounting hole 68 is spaced a fixed mounting distance D from the central mounting hole 66 in a first direction and a second outer mounting hole 69 is spaced the same fixed mounting distance D from the central mounting hole 66 in a second direction.

In the illustrated embodiment, the central mounting hole 66 is shared by the first and second mounts 70a-b. Hence, the first mount 70a includes the central mounting hole 66 and the first outer mounting hole 68, whereas the second mount 70b includes the central mounting hole 66 and the second outer mounting hole 69. If so desired, more than three mounting holes may be employed. In such a circumstance, the first mount 70a may comprise two of these mounting holes while the second mount 70b may comprise two different mounting holes.

The mounting distance D is selected to coincide with the distance D between a pair of spaced-apart mounting rods 42 and 44 (best seen in FIG. 1). The first mounting rod 42 may pass through the central mounting hole 66 and the second mounting rod 44 may pass through the first outer mounting hole 68 or the second outer mounting hole 69, depending on the operative orientation of the blade 60.

The blade 60 of FIGS. 4A-C illustrate mounting holes 66, 68 and 69 which pass through the thickness of the body 61. It should be understood, though, that the mounting holes 66, 68 and 69 could instead be replaced with mounting points bearing the same spatial relationship as the illustrated mounting holes. Such a mounting point may, for example, comprise a recess (not shown) or protrusion (not shown) carried by one or both of the shear faces 62 and 64. The casing 32 of the housing 30 may be adapted to mate with such recesses or protrusions to fix the position of the blade 60 in one of the desired operative orientations.

FIGS. 2 and 3 illustrate the first blade 60a and the second blade 60b carried by the housing 30. In particular, the first mounting rod 42 passes through the support flanges 40a-b, through the central mounting hole 66 of each of the blades 60a-b, and through the body 91 of the cutting member 90. The first mounting rod 42 may define an axis about which the cutting member 90 may pivot when reciprocating. The second mounting rod 44 passes through the first outer mounting holes 68 (not visible in FIGS. 2 and 3) of each of the blades 60a-b. Hence, each of the blades 60a-b is mounted to the casing 32 via its first mount (70a in FIGS. 4A-C). The second outer mounting hole 69 is disposed distally of the casing 32.

The first shear face 62a of the first blade 60a and the first shear face 62b of the second blade 60b are oriented toward one another and are positioned adjacent the cutting member 90. The second shear face 64a of the first blade 60a abuts the first support flange 40a of the casing 32 and may lie flush against the inner surface of the first support flange 40a. The second shear face 64b of the second blade 60b may also be oriented outwardly away from the cutting member 90 and be mounted flush against an inner surface of the second support flange 40b of the casing 32.

With the blades 60a-b mounted in this fashion, the first shear edges 82a-b of the blades 60a-b are positioned to cooperate with the cutting member 90 to shear the workpiece W. This relative positioning of the first shear edges 82a-b with respect to the reciprocating cutting member 90 is achieved by the fixed spacing and orientation of the first shear edge 82 of each blade 60 with respect to the first pair of mounting holes 70a. This is illustrated in FIG. 4B by noting that the central mounting hole 66 is spaced a distance $S_1$ from the first shear edge 82 and the first outer mounting hole 68 is space a distance $S_2$ from the first shear edge 82. The distances $S_1$ and $S_2$ may be the same or they may differ from one another.

FIG. 4B indicates that the second outer mounting hole 69 is also spaced the same distance $S_2$ from the guide surface 80 of the blade 60. As a consequence, the orientation and spacing of the second shear edge 84 of the blade 60 with respect to the second mount 70b is the same spacing and orientation between the first mount 70a and the first shear edge 82. This allows the blade to be reoriented on the head 30 to position the second shear edge 84 adjacent to the reciprocating cutting member 90 for cooperation therewith to cut a workpiece W simply by switching from the first mount 70a to the second mount 70b.

When the cutting edge of a finger of the hand-held FCS cutting tool of the '303 patent becomes dull or the facing surface of the finger becomes too worn, the finger is commonly replaced with a new finger. Given the strength and abrasion-resistant requirements of such a finger, though, the finger can be fairly expensive. The effective life of a blade 60 in accordance with the embodiment of FIGS. 1-4 is effectively double the total life of one of the fingers used in connection with the tool of the '303 patent. When the first shear edge 82 of the blade 60 becomes dull, the blade 60 can be detached from the casing 32. Rather than disposing of the blade 60, the blade can be flipped lengthwise to position the second outer mounting hole 69 to receive the second mounting rod 44 therethrough. This orients the first shear face 62 outwardly into abutment with the casing 32 and spaces the first shear edge 82 transversely outwardly from the cutting member 90. Mounting the blade in this position also orients the second shear face 64 inwardly toward the cutting member 90 and positions the second shear edge 84 adjacent the reciprocating blade 92 to cooperate with the cutting member 90 to cut a workpiece W. The second shear edge 84 was previously spaced transversely outwardly from the cutting member 90 when the cutting member 90 sheared the workpiece W with the first shear edge 82. As a result, the second shear edge 84 will remain sharp and ready for use even if the blade 60 has already been used to cut a number of workpieces W using the first shear edge 82. FIGS. 5-6 illustrate an alternative embodiment of the invention. The blade 60 of FIGS. 1-4 effectively doubles the useful life of the blade by providing a pair of shear edges 82 and 84, each of which can be selectively positioned adjacent the reciprocating cutting member 90 to shear a workpiece W. The blade 160 of FIGS. 5-6 effectively quadruples the life of a single blade by providing four spaced-apart shear edges 182, 184, 186, and 188, each of which can be positioned to cut a workpiece with the cutting member 90.

Figure 5A:
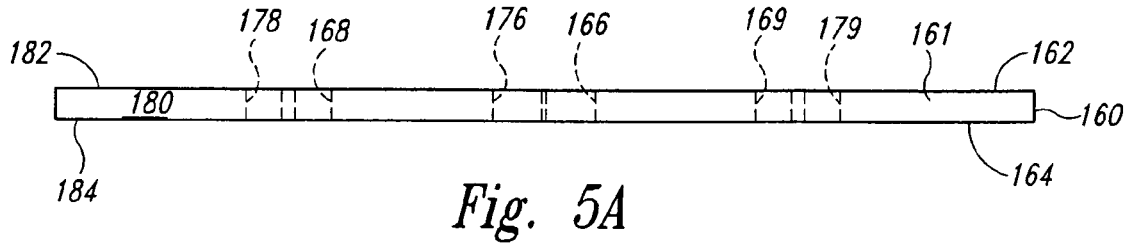
FIG. 5A is a bottom elevational view of a blade in accordance with another embodiment of the invention.
Figure 5B:
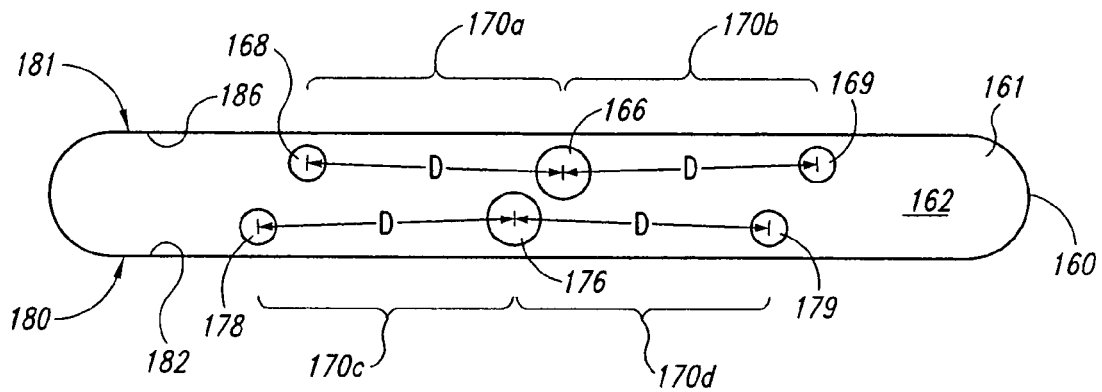
FIG. 5B is a side elevational view of the blade of FIG. 5A.
Figure 5C:
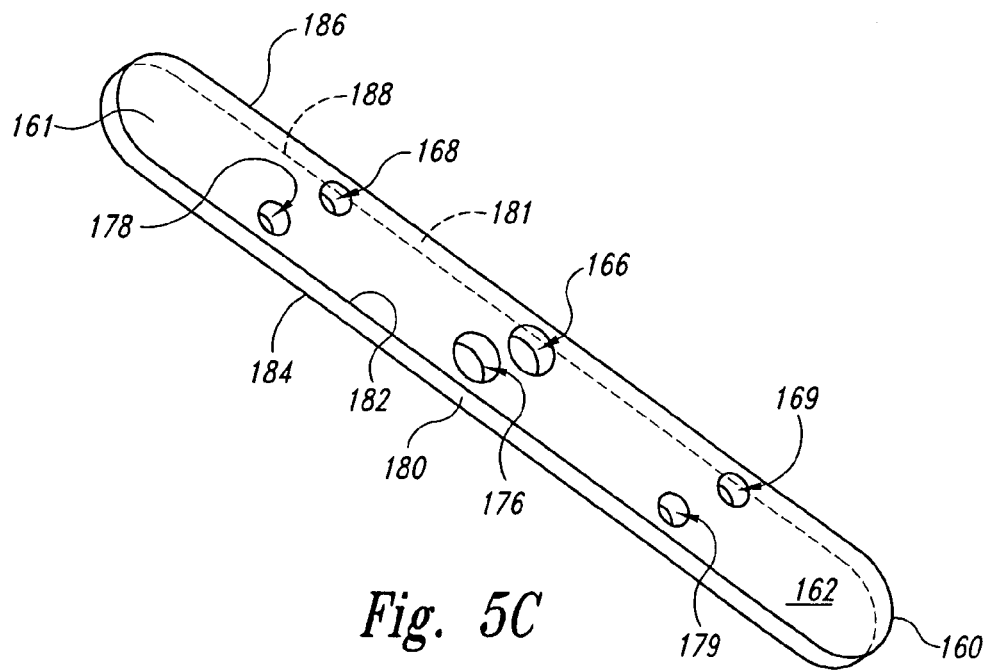
FIG. 5C is a bottom isometric view of the blade of FIG. 5A.
Figure 6:
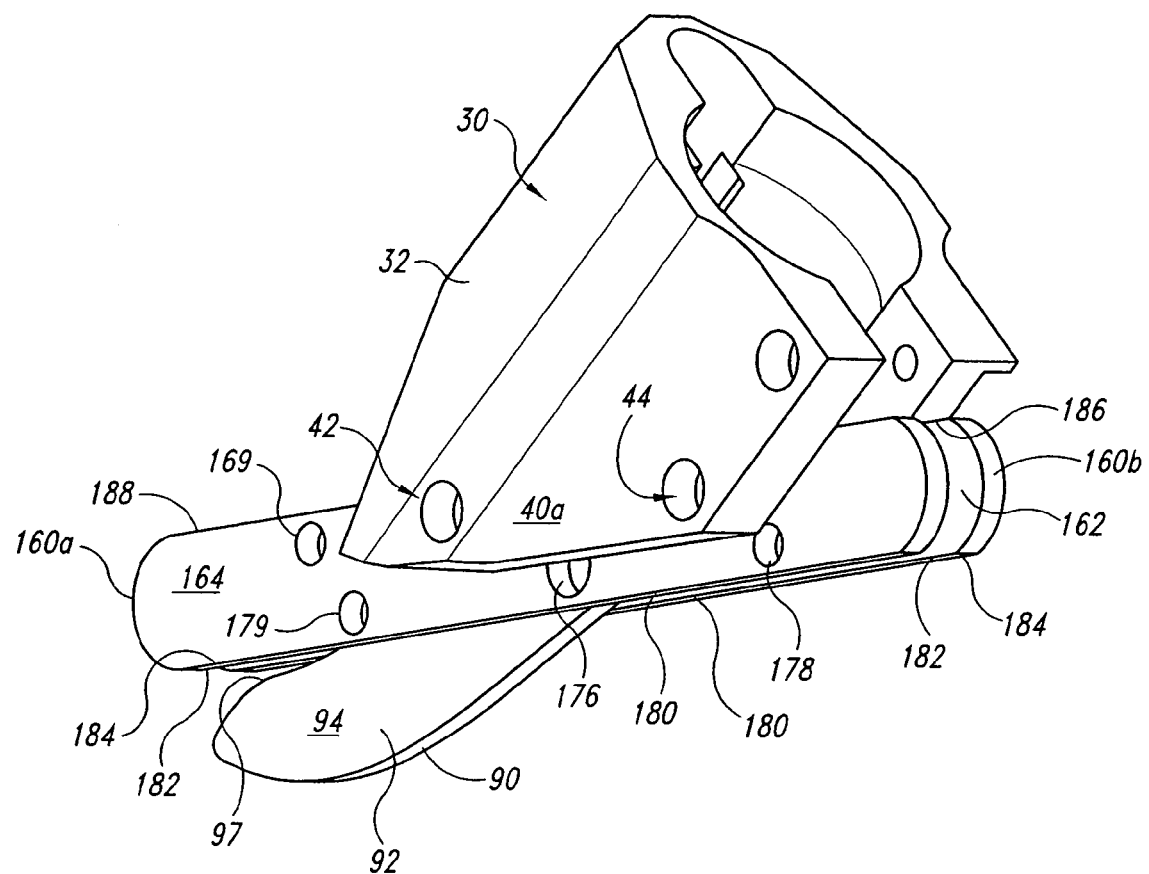
FIG. 6 is a side isometric view of a casing and blade set in accordance with an embodiment of the invention utilizing a pair of the blades shown in FIGS. 5A-5C.

Much like the blade 60 of FIGS. 4A-C, the blade 160 of FIGS. 5A-C has a first shear face 162 and a second shear face 164. The shear faces 162 and 164 are spaced from one another to define a thickness of the body 161. A first guide surface 180 extends between the first and second shear faces 162 and 164 along a first elongate edge of the body 161. A second guide surface 181 extends between the first and second shear faces along a second elongate edge of the body 161. The first and second guide surfaces 180 and 181 may be generally parallel to one another, as shown. A first shear edge 182 is defined at the junction between the first guide surface 180 and the first shear face 162. A second shear edge 184 is defined at the junction between the first guide surface 180 and the second shear face 164. A third shear edge 186 is defined at the junction between the second guide surface 181 and the first shear face 162. A fourth shear edge 188 is defined at the junction between the second guide surface 181 and the second shear face 164.

The blade 160 has at least five mounting points by which the blade 160 can be mounted to the housing 30 of the handheld tool 10. These mounting points are typified in the drawings as mounting holes which pass through the thickness of the body 161. In an alternative embodiment, the mounting points may comprise protrusions or recesses in the faces 162 and 164 of the blade 160, much as noted above in connection with the blade 60.

The blade 160 may include at least one central mounting hole 166, a first outer mounting hole 168, a second outer mounting hole 169, a third outer mounting hole 178, and a fourth outer mounting hole 179. If a single central mounting hole 166 is employed, each of the outer mounting holes 168, 169, 178, and 179 may be spaced the same fixed mounting distance D from the central mounting hole 166. In the illustrated embodiment, the blade 160 includes two central mounting holes. The first central mounting hole 166 is spaced the fixed mounting distance D from the first outer mounting hole 168 and from the second outer mounting hole 169. A second central mounting hole 176 is spaced the same mounting distance D from the third outer mounting hole 178 and the fourth outer mounting hole 179.

The first central mounting hole 166 and the first outer mounting hole 168 define a first pair of mounting holes 170a. The first central mounting hole 166 and the second outer mounting hole 169 define a second pair 170b of mounting holes. The second central mounting hole 176 and the third outer mounting hole 178 define a third pair 170c of mounting holes. The second central mounting hole 176 and the fourth outer mounting hole 179 define a fourth pair 170d of mounting holes.

FIG. 6 illustrates a first blade 160a and a second blade 160b attached to the casing 32 of the housing 30. Each of the blades 160a-b is attached to the casing 32 via the first pair (170a in FIG. 5B) of mounting holes by passing the first and second mounting rods 42 and 44 therethrough. This orients the first shear edge 182a of the first blade 160a and the first shear edge 182b of the second blade 160b adjacent the cutting member 90 to cut a workpiece W.

Because the mounting holes of each pair 170 are spaced from one another the same mounting distance D, the blade 160 can be reoriented in four different operative orientations by passing the mounting rods 42 and 44 through different pairs 170 of mounting holes in the blade 160. Each of the pairs 170 of mounting holes is spaced a fixed distance from and has a fixed orientation with respect to an associated one of the shear edges. In particular, the first pair 170a of mounting holes is associated with the first shear edge 182, the second pair 170b of mounting holes is associated with the second shear edge 184, the third pair 170c of mounting holes is associated with the third shear edge 186, and the fourth pair 170d of mounting holes is associated with the fourth shear edge 188. By attaching the blade 160 to the casing 32 with the mounting rods 42 and 44 extending through any one of the four pairs 170 of mounting holes, the shear edge associated with the selected pair of mounting holes will be positioned to cooperate with the cutting member 90 to shear a workpiece W. As a consequence, by simply flipping the blades 160a and 160b to different operative orientations with respect to the casing 32, each blade 160a-b can provide four different shear edges for cutting workpieces W. This effectively quadruples the life of the blades.

Another embodiment of the invention provides a method of reconfiguring a cutting head for a hand-held cutting tool such as the cutting tool 10 shown in FIG. 1, though other designs (including, but not limited to, the embodiment of FIGS. 5-6) may be employed instead. In a first operative orientation of the blades 60a and 60b, the first shear edge 62 of each blade is positioned adjacent the reciprocating cutting member 90 for cooperation therewith and the second shear edge 64 of each blade 60 is spaced transversely outwardly of both the reciprocating cutting member 90 and the first shear edge 62. In one method of the invention, the first mount 70a of the first blade 60a is detached from the casing 32. The body 61 of the first blade 60a is turned and the second mount 70b of the first blade 60b is mated to the casing 32 to attach the first blade 60 to the casing 32 in a second operative orientation. In this second operative orientation, the second shear edge 64a of the first blade 60a is positioned adjacent the reciprocating cutting member 90 for shearing a workpiece W and the first shear edge 62 of the first blade 60 is positioned transversely outwardly of both the reciprocating cutting member 90 and the second shear edge of the first blade. Much the same process can be used to reorient the second blade 60b to position its second shear edge 64b adjacent the cutting member 90.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of reconfiguring a cutting head for a hand-held cutting tool, the method comprising:
providing a cutting head having a casing configured to carry first and second blades and a reciprocating cutting member which reciprocates between the first and second blades about a rotation axis located at least approximately at a midsection of the first and second blades, the individual first and second cutting blades including a body having spaced-apart first and second shear edges, a first mount mating with the casing, and a second mount configured to mate with the casing, the individual first and second shear edges including a first section and a second section different than the first section, the first section of the first shear edge being positioned forward of the rotation axis at a cutting zone adjacent to the reciprocating cutting member for cooperation therewith and shearing a workpiece, the second sections of the first and second shear edges being positioned aft of the rotation axis and aft the cutting zone;
detaching the first mount of the first blade from the casing;
turning the body of the first blade; and
attaching the second mount of the first blade to the casing to attach the first blade to the casing, wherein the second section of the second shear edge of the first blade is positioned forward of the rotation axis and in the cutting zone adjacent to the reciprocating cutting member for shearing the workpiece and the first sections of the first and second second shear edges of the first blade are positioned aft of the rotation axis and aft of the cutting zone.

2. The method of claim 1, further comprising cutting the workpiece with the second section of the second shear edge of the first blade by reciprocating the reciprocating cutting member after attaching the second mount of the first blade to the casing.

3. The method of claim 1, further comprising: detaching the first mount of the second blade from the casing;
turning the body of the second blade; and
attaching the second mount of the second blade to the casing to attach the second blade to the casing, thereby positioning the second section of the second shear edge of the second blade adjacent to the reciprocating cutting member and at the cutting zone for shearing the workpiece and spacing apart the first section of the second shear edge of the second blade from the cutting zone.

4. The method of claim 3, further comprising cutting the workpiece with the second section of the second shear edge of the first blade and the second section of the second shear edge of the second blade by reciprocating the reciprocating cutting member after attaching the second mount of the second blade to the casing.

5. The method of claim 1 wherein:
the first mount of the first blade comprises a first plurality of mounting holes;
the second mount of the first blade comprises a second plurality of mounting holes;
the first plurality of mounting holes comprise a first hole;
the second plurality of mounting holes comprise the first hole; and
attaching the second mount of the first blade to the casing comprises placing a mounting member in the first hole.

6. The method of claim 1, further comprising interchanging the first and second blades with each other.

7. The method of claim 1 wherein attaching the first blade to the casing comprises positioning the first blade such that the second shear edge of the first blade and the first shear edge of the second blade are parallel to one another and define a gap sized to receive the reciprocating cutting member.

8. A method of reconfiguring a cutting head for a hand-held cutting tool, the method comprising:
providing a cutting head having a casing configured to carry first and second blades and a reciprocating cutting member which reciprocates between the first and second blades about a rotation axis located at least aporoximately at a midsection of the first and second blades, the individual first and second cutting blades including a body having spaced-apart first and second shear faces and a hole extending between the first and second shear faces, the first shear face having a first shear edge and the second shear face having a second shear edge, the individual first and second shear edges including a first section and a second section different than the first section, the first section of the first shear edge being positioned forward of the rotation axis in a cutting zone adjacent to the reciprocating cutting member for cooperation therewith and shearing a workpiece, and the second sections of the first and second shear edges being positioned aft of the rotation axis and aft of the cutting zone; and detaching the first blade from the casing by removing a first mounting member from the hole; and reattaching the first blade to the casing by placing a second mounting member in the hole, wherein the first blade is positioned with the second section of the second shear edge forward of the rotation axis and in the cutting zone adjacent to the reciprocating cutting member for cooperation therewith and shearing the workpiece, and with the first sections of the first and second shear edges of the first blade being positioned aft of the rotation axis and aft of the cutting zone.

9. The method of claim 8, further comprising cutting the workpiece with the second section of the second shear edge of the first blade by reciprocating the reciprocating cutting member after reattaching the first blade to the casing.

10. The method of claim 8, further comprising:

detaching the second blade from the casing by removing a third mounting member from the hole; and reattaching the second blade to the casing by placing a fourth mounting member in the hole, wherein the second blade is positioned with the second section of the second shear edge adjacent to the reciprocating cutting member for cooperation therewith and at the cutting zone for shearing the workpiece, and with the first section of the second shear edge spaced apart from the cutting zone.

11. The method of claim 10, further comprising cutting the workpiece with the second section of the second shear edge of the first blade and the second section of the second shear edge of the second blade by reciprocating the reciprocating cutting member after reattaching the second blade to the casing.

12. The method of claim 8, further comprising interchanging the first and second blades with each other.

13. The method of claim 8 wherein reattaching the first blade to the casing comprises positioning the first blade such that the second shear edge of the first blade and the first shear edge of the second blade are parallel to one another and define a gap sized to receive the reciprocating cutting member.

14. The method of claim 8 wherein the first and second mounting members comprise a single mounting rod.

* * * * *